United States Patent

Wallgren

[15] 3,695,284

[45] Oct. 3, 1972

[54] VALVE STRUCTURE FOR CONTROLLING FLOW OF LIQUID INTO A PNEUMATIC LIQUID DISPOSAL SYSTEM

[72] Inventor: Harald Anton Ake Wallgren, Alvsjo, Sweden

[73] Assignee: Aktiebolaget Electrolux, Stockholm, Sweden

[22] Filed: June 11, 1971

[21] Appl. No.: 152,276

[30] Foreign Application Priority Data
June 18, 1970 Sweden..................8434/70

[52] U.S. Cl. ..................137/188, 137/204, 137/390
[51] Int. Cl. ..............................................F16t 1/12
[58] Field of Search..............137/204, 188, 390, 389

[56] References Cited

UNITED STATES PATENTS 3,429,329  2/1909  Berkley..................137/204 X
2,720,891  10/1955  Glasgow.................137/188 X

*Primary Examiner*—Alan Cohan
*Attorney*—Edmund A. Fenander

[57] ABSTRACT

Liquid is discharged into a conduit of a pneumatic liquid disposal system from an inlet conduit. Valve structure is interposed between the inlet conduit and liquid disposal system which opens when a sufficient quantity of liquid is present in the inlet conduit and closes when the flow of liquid thereto stops. The valve structure has a flexible diaphragm which functions as a pressure sensing means and initially flexes responsive to the presence of liquid in the inlet conduit and acting on one side of the diaphragm. Such initial flexing movement of the diaphragm causes the pressure at the opposite side of the diaphragm to be reduced below atmospheric pressure and establish a pressure differential across the diaphragm to effect further movement thereof and open a main valve to enable liquid from the inlet conduit to be discharged into the pneumatic liquid disposal system.

19 Claims, 2 Drawing Figures

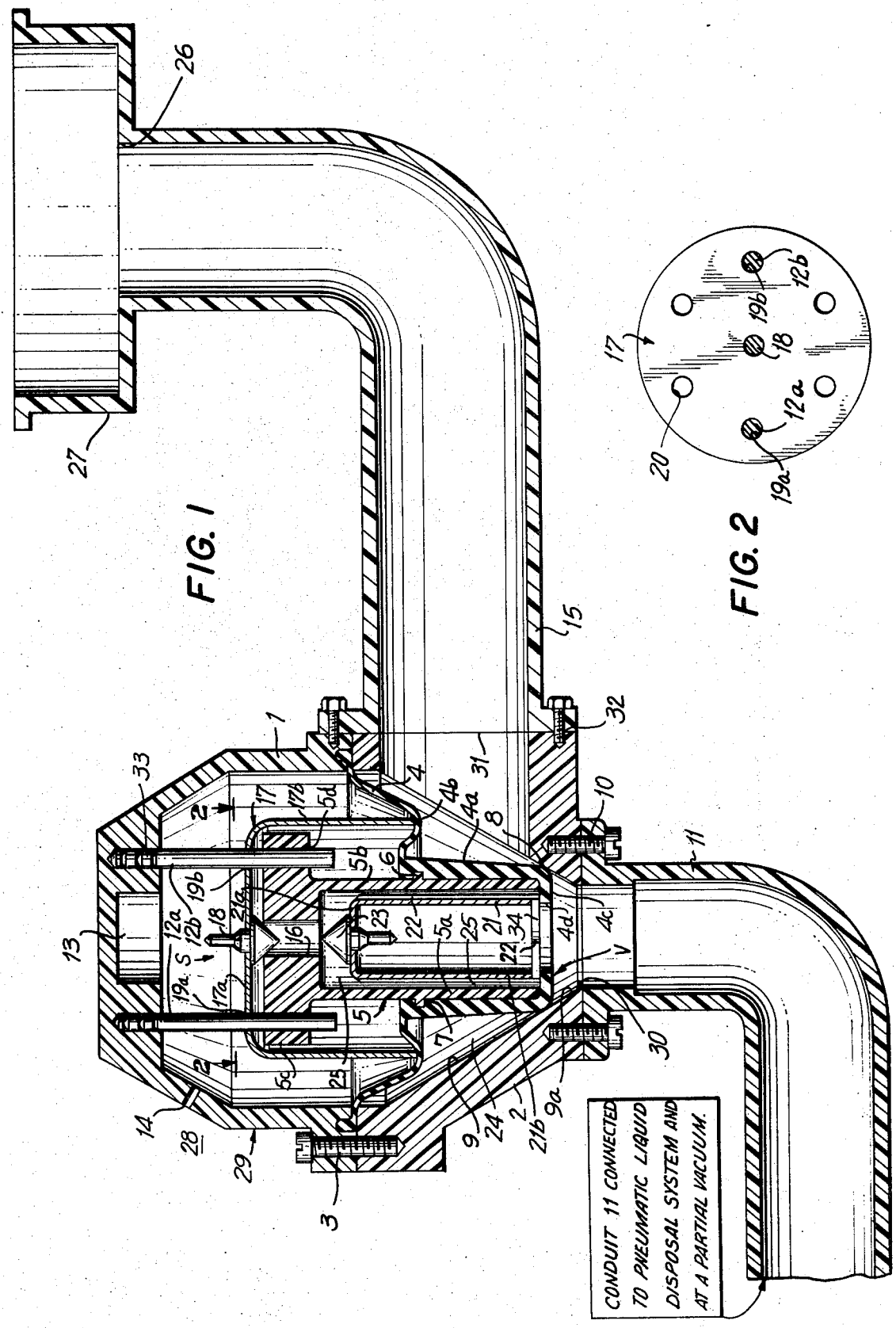

3,695,284

VALVE STRUCTURE FOR CONTROLLING FLOW OF LIQUID INTO A PNEUMATIC LIQUID DISPOSAL SYSTEM

BACKGROUND OF THE INVENTION

1. Field of the Invention

In a pneumatic liquid disposal system provision must be made for controlling the discharge of liquid into the system from a place which receives the liquid and in which it is held.

2. Description of the Prior Art

A main valve and operating mechanism are usually employed to control the flow of liquid from an inlet conduit into a pneumatic liquid disposal system. The main valve, which normally is closed, is moved to its open position by mechanism responsive to the sub-atmospheric pressure prevailing in the pneumatic liquid disposal system. Such mechanism heretofore has involved using a control valve which, in the direction in which liquid flows, is ahead of the main valve and opens and closes responsive to a pressure condition influenced by the quantity of liquid in the inlet conduit which also may be referred to as a drain conduit.

When the control valve opens responsive to hydrostatic pressure of liquid in the drain conduit the operating mechanism is activated whereby the partial vacuum or sub-atmospheric pressure in the pneumatic liquid disposal system becomes available to cause the main valve to open. A control arrangement of this kind makes it necessary to employ two valve units which are located at different places and require connections from one to the other and also to the drain conduit and to the pneumatic liquid disposal system at a region which is downstream from the location of the main valve. An arrangement of this kind is objectionable because it is complicated and relatively expensive.

SUMMARY OF THE INVENTION

My invention relates to controlling the discharge of liquid from an inlet or drain conduit into a pneumatic liquid disposal system by improved valve structure which is compact and only requires two connections to install it between a liquid inlet or drain conduit and a discharge conduit of a pneumatic liquid disposal system.

I accomplish this by providing valve structure comprising a casing having a flexible diaphragm which functions as a pressure sensing means and initially flexes responsive to the presence of a sufficient quantity of liquid in the inlet or drain conduit and acting on one side of the diaphragm. Such initial flexing movement of the diaphragm causes the pressure at the opposite side of the diaphragm to be reduced below atmospheric pressure and establish a pressure differential across the diaphragm to effect further movement thereof and open a main valve to enable liquid from the inlet conduit to be discharged into the pneumatic liquid disposal system.

In the preferred embodiment the pressure at the opposite side of the diaphragm is reduced with the aid of a passageway which is normally closed by sealing means and extends through the diaphragm from the opposite side thereof and is in communication with a region of the discharge conduit which is connected to the outlet of the valve structure and at a partial vacuum or sub-atmospheric pressure. The main valve comprises a hollow tubular member which is fixed to the diaphragm at the opening therein and forms a part of the passageway establishing communication between the region of the discharge conduit at a partial vacuum and the opposite side of the diaphragm. The sealing means normally closing the passageway is rendered ineffective by the initial flexing movement of the diaphragm whereby the pressure at the opposite side of the diaphragm is reduced below atmospheric pressure.

BRIEF DESCRIPTION OF THE DRAWING

In the drawing

FIG. 1 is a vertical sectional view illustrating valve structure which embodies the invention for controlling the discharge of liquid from an inlet or drawing conduit into a pneumatic liquid disposal system; and FIG. 2 is a fragmentary horizontal sectional view taken at line 2—2 of FIG. 1.

DESCRIPTION OF THE PREFERRED EMBODIMENT

In FIG. 1 I have shown my invention in connection with a pneumatic liquid disposal system for controlling the discharge of liquid into the system responsive to the hydrostatic pressure of a body of the liquid in an inlet or drain conduit 15. Waste liquid flows by gravity into the inlet or drain conduit 15 from an outlet 26 of a place 27 in a kitchen or laundry or a fixture in a bathroom like a bath tub or wash basin, for example. The liquid flows from the drain conduit 15 into a discharge conduit 11 which is adapted to be connected to a pneumatic sewage or liquid disposal system and maintained at a partial vacuum or sub-atmospheric pressure which may be one-half of atmospheric pressure, for example.

Valve structure 28, which is operatively associated with the inlet conduit 15 and discharge conduit 11, opens when liquid starts to flow from the place 27 and closes when such flow of liquid stops. The valve structure 28 comprises a casing 29 having top and bottom parts 1 and 2 which are fixed to one another at 3, as by cap screws, for example, with the outer peripheral edge portion of a flexible diaphragm 4 clamped therebetween.

The flexible diaphragm 4 is formed of a suitable elastomeric material, such as rubber, for example, which divides the casing 29 into top and bottom chambers 13 and 24, respectively. The diaphragm 4 is of annular form and has a central opening therein defined by a hollow sleeve 4a. The hollow sleeve 4a depends downward from the inner peripheral edge portion of the diaphragm 4 and is thicker than the part of the diaphragm which extends radially outward therefrom and includes a corrugated section 4b adjacent to the sleeve 4a.

The lower end of the sleeve 4a is formed with an inturned flange 4c defining an opening 4d. The sleeve 4a forms part of a valve member V, as will be described presently, which moves from and toward a valve seat 9a at the lower end of the inner wall 9 of the bottom part 2 of the casing 29 which is of conical form. The valve seat 9a is at the immediate vicinity of the outlet 30 of the valve structure 28 at which region the discharge conduit 11 of the pneumatic liquid disposal system is connected thereto at 10, as by cap screws, for example.

When the valve member V is in its closed position at the seat 9a, the surface 8 of the inturned flange 4c of the hollow sleeve 4a is in sealing relation with the valve seat.

The sleeve 4a is disposed about the lower portion 5a of a hollow tubular member or piston 5 having an upper portion 5b in end to end relation therewith and projecting upward therefrom. The tubular member 5 is essentially rigid and formed of a suitable elastomeric material like hard rubber or plastic, for example. The upper portion 5b of the hollow tubular member 5 is provided with an end plate 5c having a central opening 16 and additional openings 5d radially removed therefrom which are provided for a purpose to be described presently.

The lower portion 5a of the tubular member 5 fits snugly within the hollow sleeve 4a with its lower extremity engaging the inturned flange 4c thereof. Further, the inner wall of the hollow sleeve 4a is formed with spaced recesses 7 which receive spaced lugs 6 extending outward from the lower portion 5a of the tubular member 5. With this construction the hollow sleeve 4a envelops the tubular member 5 and embraces and hugs the latter and these two members form a unitary component of the valve structure 28.

Essentially, the tubular member 5 and the hollow sleeve 4a of the diaphragm 4 together form the valve member V which is movable from and toward the seat 9a. When the valve member V is in its closed position at the valve seat 9a, liquid in the inlet conduit 15 can flow into the bottom space or chamber 24 through the inlet 31 of the valve structure 28 at which region the conduit 15 is connected thereto at 32, or by cap screws, for example. Under these conditions the bottom space 24 is in open communication with the inlet conduit 15 and liquid can act on the bottom surface or face of the diaphragm 4. When the valve member V moves upward from its seat 9a to an open position, in a manner to be explained presently, liquid can flow from the space or chamber 24 through the outlet 30 into the discharge conduit 11 which, as explained above, is at a partial vacuum or sub-atmospheric pressure.

The valve member V moves in a fixed path of movement in the top space or chamber 13 with the aid of guide pins 12a and 12b which extend through the openings 5d in the end plate 5c of the tubular member 5. Hence, the openings 5d in the end plate 5c receive the lower ends of the pins 12a and 12b, the upper ends of which are anchored in recesses in the top part 1 of the casing 29, as indicated at 33 in FIG. 1.

The tubular member 5 can be referred to as conduit means which provides a passageway 25 extending through the valve member V and having its lower open end at 4d in communication with a region of the discharge conduit 11 of the liquid disposal system which is at a partial vacuum or sub-atmospheric pressure. The upper end of the passageway 25 is in communication with the upper space 13 of the valve structure 28 at the opening 16 in the end plate 5c of the tubular member 5.

I provide sealing means S in the space 13 which normally is effective to close the passageway 25 at the opening 16 and is rendered ineffective to seal the passageway responsive to a sufficient quantity of liquid in the inlet conduit 15. The sealing means S comprises a stopper 18 which can move from and toward the opening 16 and is fixed to the bottom 17a of an inverted open-ended cup 17 having a side wall 17b extending downward therefrom. The edge of the sidewall 17b of the cup 17 at its open end rests against the top surface or face of the diaphragm 4 in the trough of the corrugated section 4b thereof.

The bottom 17a of the cup 17 is provided with openings 19a and 19b which receive the lower ends of the pins 12 and 12b. Hence, when the cup 17 moves vertically responsive to flexing movement of the diaphragm 4, the cup 17 will be guided by the pins 12a and 12b so that the stopper 18 will always be in alignment with the opening 16 in the end plate 5c of the tubular member 5. Further, the bottom 17a of the cup 17 is provided with openings 20 to insure that the pressure inside and outside the cup will be the same. Hence, the openings 20 function to equalize the air pressure inside and outside the cup.

I also provide in the passageway 25 a float 21 having a stopper 23 which functions to prevent liquid from accidentally rising in the passageway 34 and flowing into the upper space or chamber 13. As shown, the float 21, which may be formed of light weight plastic, comprises an inverted open-ended cup having a bottom 21a and a side wall 21b extending downward therefrom. The stopper 23 is fixed to the bottom 21a of the cup 21 and closes the opening 16 in the end plate 5c of the tubular member 5 when the cup 21 rises in the passageway 25 responsive to presence of liquid in the latter.

A plurality of vertical ridge elements 22 are distributed about the float 21 and fixed to the outside of the side wall 21b thereof. As seen in FIG. 1, the ridge elements 22 extend downward below the open end of the float 21 and rest on the inturned flange 4c of the hollow sleeve 4a of the diaphragm 4. In this way a gap 34 is provided between the open end of the float or cup 21 and the inturned flange 4c so that the passageway 25 will always be open between the openings 4d and 16 at its opposite ends when the float 21 is in its lowest position seen in FIG. 1.

In view of the foregoing, it will now be understood that the diaphragm 4 functions as pressure sensing means which is influenced by liquid in the inlet conduit 15 and space 24 and acting on one side or the bottom of the diaphragm. When a sufficient quantity of liquid is present in the inlet conduit 15, the part of the diaphragm 4 extending radially outward from the hollow sleeve 4a thereof and including the corrugated section 4b initially flexes upward and imparts upward movement to the inverted cup 17.

In this way sealing means S will be operated, that is, the stopper 18 is moved upward from its closed position at the opening 16, whereby the passageway 25 will be opened. When this occurs the space 13 above the diaphragm 4, through the passageway 25, will be in communication with a region in the discharge conduit 11 which is at a partial vacuum or sub-atmospheric pressure. On the other hand, the pressure on the one side or bottom of the diaphragm 4 will be above atmospheric pressure and dependent upon the hydrostatic pressure of liquid in the inlet conduit 15.

With the passageway 25 now open, the pressure at the opposite side or top of the diaphragm 4 will be reduced below atmospheric pressure, thereby establishing a pressure differential across the diaphragm 4 to effect further upward movement thereof and open valve V to enable liquid from the inlet conduit 11 to be discharged into the conduit 15 which is connected to and forms a part of the pneumatic liquid disposal system.

When the flow of liquid into the inlet conduit 15 is reduced and air at atmospheric pressure passes into the inlet conduit 15 and acts against the bottom of the diaphragm 4, such air temporarily tends to balance the pressure of the air acting against the top of the diaphragm which is at sub-atmospheric pressure. Stated another way, the pressure differential across the diaphragm 4 will be reduced when the flow of liquid into the inlet conduit 15 stops. At the same time, air at atmospheric pressure will bleed into the space 13 through the opening 14 in the casing 29. With ambient air leaking into the space 13 through the opening 14 in the casing 29, air at the same pressure soon will be acting against both sides of the diaphragm 4 and the valve V will move downward by gravity to its closed position in sealing relation with the valve seat 9a. The sealing means S follows the downward movement of the valve V, such downward movement being effected with the aid of gravity. Under these conditions the inverted cup 17 will move downward until the stopper 18 moves to its closed position at the opening 16, whereby the sealing means S again will be effective to seal the passageway 25 so that the space 13 no longer will be in communication with the region of discharge conduit 11 at a partial vacuum or sub-atmospheric pressure.

In order to insure that the valve structure 28 will operate properly, and more particularly that the valve member V will always move to its closed position in the manner explained above, the cross-sectional area of the valve inlet conduit 15 desirably should be larger than the cross-sectional area of the discharge conduit 11, so that the greater part of the pressure drop of the liquid will develop in the discharge conduit 11.

I claim:

1. In a liquid disposal system having an inlet conduit into which liquid is adapted to flow and a discharge conduit which is adapted to be maintained at least at a partial vacuum and into which liquid flows from the inlet conduit,
   a. valve structure which is interposed between the inlet conduit and discharge conduit and opens responsive to a sufficient quantity of liquid in the inlet conduit and closes when the flow of liquid thereto stops,
   b. said structure including a casing having means defining a valve seat and an inlet and outlet for liquid which are adapted to be connected to the inlet and discharge conduits, respectively,
   c. a valve member which is movable from and toward said seat,
   d. means including a diaphragm for operating said valve member,
   e. said diaphragm dividing said casing into first and second spaces and having an opening therein,
   f. said second space being in communication with the inlet conduit,
   g. means providing a passageway which extends through the opening in said diaphragm and has one end thereof in communication with a region of the discharge conduit at a vacuum and the other end thereof in communication with said first space,
   h. said casing having an opening for bleeding ambient air into said first space, and
   i. sealing means effective and ineffective to close said passageway,
   j. said sealing means being so constructed and arranged that, when liquid flows into the inlet conduit, it is acted upon and moves in such a direction that it is rendered ineffective and said first space and the region of the discharge conduit at a vacuum are in communication with one another through said passageway which is open, and, when the flow of liquid to the inlet conduit stops, it is acted upon and moves back in the opposite direction and is rendered effective whereby said first space is no longer in communication with the region of the discharge conduit at a vacuum through said passageway which is closed.

2. Apparatus as set forth in claim 1 in which the cross-sectional area of the opening in said casing for bleeding ambient air into said first space is relatively small compared to the cross-sectional area of said passageway which establishes communication between said first space and the region of the discharge conduit at a vacuum when said sealing means is rendered ineffective to close said passageway.

3. Apparatus as set forth in claim 1 in which said sealing means is disposed in said first space.

4. Apparatus as set forth in claim 1 in which said diaphragm is of annular form having inner and outer peripheral edges, means for anchoring the outer peripheral edge of said diaphragm to a wall of said casing, said valve member comprising a tubular part which serves as a portion of said diaphragm and has one end thereof fixed to the inner peripheral edge of said diaphragm and the opposite end thereof bearing against said seat when said valve member is in sealing relation therewith.

5. Apparatus as set forth in claim 4 which includes a tubular piston, said tubular part being disposed about and enveloping a first portion of said tubular piston, said tubular piston including a second portion which is in end to end relation with said first portion and extends into said first space, an inverted open-ended cup having a bottom and side wall extending therefrom, said cup having pressure equalizing openings, and said sealing means comprising said cup disposed in said first space with the edge of its side wall at the open end thereof bearing against the surface of said diaphragm facing said first space and with a part associated with its bottom in sealing relation with said tubular piston when it is rendered effective.

6. Apparatus as set forth in claim 1 in which said means defining said valve seat is at the vicinity of the outlet of said casing and adjacent to the region at which the discharge conduit is adapted to be connected to the outlet.

7. Apparatus as set forth in claim 5 in which the second portion of said tubular piston at its outer end has an end wall formed with an opening, a member within said tubular piston which is vertically movable therein and functions as a float and moves vertically upward therein responsive to liquid flowing into said tubular piston from the discharge conduit, said float including a part which, with sufficient upward movement of said float, moves in sealing relation with the opening in the end wall of said tubular piston, thereby preventing liquid from entering said first space.

8. In a liquid disposal system having an inlet conduit into which liquid is adapted to flow and a discharge conduit which is adapted to be maintained at least at a partial vacuum and into which liquid flows from the inlet conduit,
   a. structure including a casing having means defining a valve seat and an inlet and outlet for liquid which are adapted to be connected to the inlet and discharge conduits, respectively,
   b. means including a flexible diaphragm dividing the interior of said casing into two chambers, one of said chambers being in communication with the inlet,
   c. a valve,
   d. means including said diaphragm for moving said valve from and toward said seat for controlling flow of liquid from the inlet conduit to the discharge conduit,
   e. conduit means adapted to be connected to a region at a vacuum,
   f. said conduit means being in communication with the other of said chambers,
   g. sealing means associated with said conduit means which functions to open and close the latter, and
   h. means including said flexible diaphragm for operating said sealing means.

9. Apparatus as set forth in claim 8 in which said flexible diaphragm functions as a pressure sensing means influenced by liquid in the inlet conduit, and said diaphragm is so constructed and formed that it initially flexes responsive to a sufficient quantity of liquid in the inlet conduit to operate said sealing means and open said conduit means, whereby the pressure in the other of said chambers is reduced and at a vacuum to cause said diaphragm to flex further and effect movement of said valve from its seat responsive to the pressure differential across said diaphragm.

10. Apparatus as set forth in claim 8 in which said structure has an opening for bleeding ambient air into the other of said chambers.

11. Apparatus as set forth in claim 8 in which said sealing means is disposed in the other of said chambers and includes one part which is acted upon by said diaphragm and moves responsive to movement of the latter and another part which serves to open and close said conduit means in communication with the other of said chambers.

12. Apparatus as set forth in claim 11 in which said sealing means comprises an inverted open-ended cup having a bottom and a side wall extending vertically downward therefrom, the edge of said side wall at the open end of said cup being in physical contact with said diaphragm.

13. Apparatus as set forth in claim 11 in which said casing includes means for guiding said cup during vertical movement thereof in the other of said chambers.

14. Apparatus as set forth in claim 11 in which said guiding means include vertically disposed members in the other of said chambers, the bottom of said cup being apertured to receive said members.

15. Apparatus as set forth in claim 12 in which the bottom of said cup is apertured to equalize the pressure within and outside said cup to promote vertical movement thereof in the other of said chambers.

16. Apparatus as set forth in claim 8 in which said diaphragm is formed with an opening and said conduit means extends therethrough and is in communication with the discharge conduit which constitutes said region at a vacuum.

17. Apparatus as set forth in claim 16 in which said valve comprises a hollow sleeve which is carried by said diaphragm at the opening therein and forms a part of said conduit means.

18. Apparatus as set forth in claim 17 which includes a tubular member having first and second portions in end to end relation which form parts of said conduit means, said hollow sleeve being disposed about and enveloping the first portion of said tubular member, the second portion of said tubular member being disposed in the other chambers and having an end wall formed with an opening serving as a seat for said sealing means.

19. Apparatus as set forth in claim 18 in which said tubular member and end wall thereof define a space, a part in said space which is vertically movable therein and functions as a float which moves upward responsive to liquid entering said space from the discharge conduit, said float including means which functions as a valve and closes the opening in the end wall of said tubular member with upward movement of said float.

* * * * *